Patented May 9, 1933

1,908,485

UNITED STATES PATENT OFFICE

JOSEPH V. MEIGS, OF HASTINGS UPON HUDSON, NEW YORK, ASSIGNOR TO SWEETS LABORATORIES INC., OF NEW YORK, N. Y., A CORPORATION OF NEW YORK

PLASTIC AND PROCESS OF MAKING SAME

No Drawing. Application filed October 15, 1927, Serial No. 226,523. Renewed December 29, 1932.

This invention relates to plastic bodies, produced by reaction between carbohydrates and alcohols, more particularly polyhydric alcohols, of which glycerine is a common example.

One of the objects of the present invention is the production of a resin which possesses in as high as possible a degree the peculiar surface hardness, resistance to abrasion, adhesiveness, toughness and mechanical strength of the better grades of shellac, and which may be used to replace shellac, as for example in processes wherein a hot plastic mixture of resin and filler is pressed in relatively cool molds.

Another object is to provide a resin which may be hardened by suitable heat treatment and also used to prepare heat resistant products comprising the resin alone or supported on coated or impregnated extending material, such for example as paper, fabric or comminuted substances such as wood pulp or flour, asbestos, mica, kaolin etc.

Another object is to provide a resin or plastic not dependent on phenols for its preparation.

It has been found that carbohydrates may be reacted with polyhydric alcohols to form products useful in the resin and plastic arts. Dextrose and glycerine, for example, two extremely hygroscopic and water soluble materials, may by suitable means, as hereinafter described, be reacted to form a product difficultly soluble in water, possessing plastic properties and adapted to supplant natural resins and perform other useful functions.

It is known that carbohydrates when subjected to decomposition by natural agencies (decay) or by artificial means, as for example by the action of mineral acids, yield bodies known by the terms humins, humic acids, humus etc. In the preferred form of the present invention I preferably select conditions adapted to decompose the carbohydrate to produce such humic derivatives, impose these conditions on the carbohydrate in the presence of a polyhydric alcohol, and then proceed as hereinafter described, to produce the desired resinous product. In the preferred form of the invention I employ a converting agent, high temperatures and the elimination of volatile by-products, especially any water, that may be formed, during the reaction between polyhydric alcohol and carbohydrate or between the polyhydric alcohol and the carbohydrate-decomposition products, or by both processes.

For example, the carbohydrate may be heated with glycerine and a small proportion of converting agent in a distilling vessel (commonly called a still) provided with a fractionating column capable of being maintained at such temperatures as to permit passage through it of the vapor of water or other similarly volatile or more volatile substances and to condense and return to the still higher boiling bodies as for example glycerine. The fractionating column is provided at its upper end with a downwardly inclined condenser, the temperature of which is regulated, as by cold water, to condense the vapors coming from the fractionating column. By means of such apparatus generation and elimination of water may take place continuously and be quantitatively and qualitatively observed. The elimination of water permits the attainment of high temperatures at atmospheric pressure and reaction between carbohydrate and glycerine may be continued until water evolution ceases, or takes place slowly.

The proportions of carbohydrate and polyhydric alcohol may be varied from those specifically disclosed. An excess of one or both the these substances or of the converting agent remaining in the final resinous product should preferably be removed, as by extraction with a suitable solvent, or by distillation, evaporation, etc. To produce a resinous product substantially free from water soluble impurities I wash the reaction mass with hot water, as by kneading it with the latter. Instead however of removing such products, as indicated, they can in some cases be converted into water insoluble derivatives. For example sulphuric acid used as a converting agent can be converted into its water insoluble barium salt and an excess of glycerine in the final product can be converted into its water insoluble litharge compound.

Mineral acids, e. g. sulphuric, hydrochloric and phosphoric acids and substances engendering these or equivalent acids are effective converting agents. Certain types of nitrogenous compounds, as for example primary aromatic amines and their salts are also good decomposing or converting agents.

The resinous product when freed from water soluble impurities and wash water is a very dark brown glossy mass, solid at room temperature and plastic when heated. It has unusual toughness and when scratched by a sharp instrument, as a phonograph needle, does not readily shatter along the scratch, but rather gives a clean cut or impression, as is the case with shellac, horn and hardened casein. It is also resilient or pliable to a considerable extent and can be deformed without rupture. These valuable properties are enhanced by a mild heat treatment and thorough drying carried out as a separate step subsequent to the washing or purification hereinabove described. This should be done with care because after being freed from impurities which exercise a solvent or plasticizing action and in the absence of other solvents, continued heating at elevated temperatures, for example 120 to 160 degrees centigrade, will bring about gradual hardening, the initially fusible material eventually becoming infusible though not necessarily rigid.

In its fusible condition the resin may be utilized in general after the manner of utilizing other fusible resins. It may be thoroughly mixed with and incorporated into various comminuted filling materials. It may be used to impregnate and coat sheets of paper or fabric. These composite materials can then be heated just enough to render plastic or tacky and then consolidated by cooling under pressure in molds or otherwise as in the shellac molding and pressing art.

On the other hand, advantage may be taken of the capacity of the resin to undergo hardening when heated to elevated temperatures. By subjecting it to temperatures of 130 to 160 degrees centigrade for a sufficient length of time, hardening or curing will take place, in the case of the resin alone or compositions comprising the resin and supporting or filling material. The length of time required for "curing" or heat-setting will vary considerably depending on the temperature used, the degree of hardening desired and the size of the article being treated. In general heating to 130 to 160 degrees centigrade for periods of ten minutes to one hour or more will effect a substantial hardening, or development of infusibility. This term does not necessarily imply rigidity. An infusible substance is one that cannot be melted to yield a liquid.

In a typical case I proceed as follows, to prepare and utilize the fusible resin:

*Example*

Use a still provided with an air cooled reflux condenser and a water cooled condenser connected to and downwardly inclined from the top of the air cooled condenser. For laboratory work, select a short neck 1.5 liter Pyrex round bottom flask as the still. Provide this with an air cooled reflux condenser consisting of a simple glass tube about 28 inches long and about $\frac{5}{16}$ inch in internal diameter. Connect the top of the air cooled reflux condenser with a downwardly inclined water cooled condenser of convenient dimensions. Connect the lower end of the reflux condenser to the flask by means of a stopper provided with two holes, one for inserting the end of the condenser and the other for inserting a thermometer to measure the temperature of the reaction mass.

Place 400 grams of C. P. glycerine in the open flask, heat the glycerine to 100 degrees centigrade and add while stirring 6 grams of concentrated sulphuric acid of specific gravity 1.83 to 1.84. Maintain these ingredients at 100 degrees centigrade for about 15 minutes and after removing the source of heat add gradually 400 grams of Argo corn sugar. This is a commercial, crude dextrose containing about 84 per cent reducing sugar, about 5 per cent dextrin and about 11 per cent moisture. After adding the carbohydrate equip the flask with the condensers and thermometer as described and apply heat. Shake the flask gently to prevent the carbohydrate from collecting at the bottom of the flask and "burning on", i. e. prematurely decomposing. The provision of stirring means is very desirable, though not absolutely essential on such a small scale as herein described.

Evolution of water will commence at about 130 degrees centigrade. This water will pass up through the reflux condenser and will be condensed in the water cooled condenser. Collect the condensate in a measuring vessel. Continue the heating and water evolution i. e. carry on a distillation process, water and other similarly volatile products passing up and through the reflux condenser and high boiling substances, e. g. glycerine, being, for the most part, retained. During the first hour, the temperature of the reacting bodies should reach about 190 degrees centigrade, during the succeeding two hours about 230 degrees centigrade and during the following hour should be maintained at 210 to 230 degrees centigrade. Stop heating at the end of four hours, at which time 250 cc. or more of aqueous distillate will be collected. At the higher temperatures the production of acrolein will be noted, readily so by virtue of its characteristic unpleasant odor and irritating effect.

It will be noted that the quantity of water evolved is much in excess of that contained in the sugar as moisture and water of crystallization, and is evidence that a large amount of water of reaction is generated.

Wash the cooled reaction product with hot water to remove water soluble material. Then subject it to a mild and controlled heat treatment in order to dry and to develop the inherent properties of the fusible resin i. e. hardness, resiliency and toughness. For this purpose spread the washed product in thin layers in pans and bake at temperatures not above 110 degrees centigrade until the major portion of the water has been eliminated. It is recommended to carry out this drying and heat treatment in a vacuum dryer at about 100 degrees centigrade.

The resin is then ready for use and may as already described be incorporated into fillers and extending material for the preparation of composite products. Such composite products may then, after being heated just enough to render plastic, be shaped and consolidated by cooling under pressure or be subjected to pressure at elevated temperatures for a length of time sufficient to cause heat-hardening or curing.

Mixture of the resin with fillers or extending material may advantageously take place before drying the resin produced as described, i. e. in its wet gelatinous condition. In that condition incorporation with fillers and the like is somewhat facilitated and the wet mixtures can readily be dried and then utilized by either of the methods described.

Instead of dextrose I can use other carbohydrates, whether monoses, dioses or polyoses, as for example the various sugars, dextrines, starches and even celluloses. I prefer however the more easily decomposable carbohydrates, e. g. sucrose, levulose, dextrose, dextrin, starch etc.

Instead of glycerine I may employ glycols, as for example ethylene glycol or propylene glycols, and other polyhydric alcohols such as erythritol and mannitol. Derivatives of the polyhydric alcohols can also be used, as for example the chlorhydrins and glycide compounds of glycerine and the condensation product of glycerine with itself, and higher trihydric alcohols such as butenyl glycerine and pentaglycerine. The excellent solvent properties of glycerine combined with its high boiling point, availability and cheapness render it preferable at the present time. Nevertheless the invention is not limited to the use of glycerine, and includes the use of other polyhydric alcohols and their equivalents.

The term horny surface means one which, when scratched, does not easily shatter along the scratch, but gives a fairly clean cut.

The term resinous connotates substantial insolubility in water.

The term condensing agent as used in this application means a substance that will cause a polyhydric alcohol to react with a carbohydrate to produce a resinous reaction product.

While it is possible to obtain some conversion of polyhydric alcohol and carbohydrate into a resinous product without a converting agent, as by using long reaction periods, I prefer to use a converting agent in order to secure suitable yields of resinous bodies as quickly as possible.

What I claim is:

1. The substantially water insoluble reaction product of glycerine and a carbohydrate.

2. The substantially water insoluble reaction product of a polyhydric alcohol and a carbohydrate.

3. The fusible resinous reaction product of a polyhydric alcohol and a carbohydrate, capable of becoming infusible by heating.

4. The fusible resinous reaction product of glycerine and dextrose, capable of becoming infusible on heating.

5. The resinous thermoplastic reaction product of a polyhydric alcohol and a carbohydrate, possessing a horny surface, and capable of deformation without rupture.

6. The resinous reaction product of dextrose, glycerine and a condensing agent.

7. The process which comprises heating a carbohydrate with a polyhydric alcohol and a condensing agent, generating water of reaction and obtaining a water insoluble, plastic reaction product.

8. The process which comprises reacting a carbohydrate and a polyhydric alcohol and obtaining a resinous reaction product.

9. The resinous reaction product of a polyhydric alcohol, a carbohydrate and a condensing agent.

10. The resinous reaction product of glycerine, dextrose and sulphuric acid.

11. The resinous reaction product of dextrose and glycerine.

12. The resinous reaction product of dextrose and a polyhydric alcohol.

13. The process which comprises heating a polyhydric alcohol with a carbohydrate and a mineral acid, to react the ingredients and volatilize water, and obtaining a resinous residue.

14. The process which comprises heating a carbohydrate with a mineral acid and a polyhydric alcohol, to decompose the carbohydrate and to unite the decomposition products with the polyhydric alcohol, and obtaining a resinous reaction product.

15. The process which comprises heating a dextrose-yielding carbohydrate, with glycerine and concentrated sulphuric acid, whereby vapor containing water is formed, fractionating said vapor to return glycerine to the reacting substances and to eliminate water therefrom and obtaining a resinous residue.

16. The process which comprises reacting a carbohydrate with a condensing agent and a polyhydric alcohol, obtaining a resinous product, heating the latter, and thereby hardening it.

17. The process which comprises reacting a carbohydrate with a condensing agent and glycerine, obtaining a resinous product, heating the latter, and thereby hardening it.

18. The process which comprises reacting a carbohydrate with an acid converting agent and a polyhydric alcohol, obtaining a resinous product, heating the latter, and thereby hardening it.

19. The process which comprises reacting a carbohydrate with a mineral acid and a polyhydric alcohol, obtaining a resinous product, heating the latter, and thereby hardening it.

20. The process which comprises reacting a dextrose-yielding carbohydrate with an acid converting agent and a polyhydric alcohol, obtaining a resinous reaction product, heating the same and thereby hardening it.

21. The process which comprises reacting a dextrose-yielding carbohydrate with an acid converting agent and glycerine, obtaining a resinous reaction product, heating the same and thereby hardening it.

22. The process which comprises reacting a carbohydrate with a polyhydric alcohol and sulphuric acid, obtaining a resinous reaction product, heating it and thereby hardening it.

JOSEPH V. MEIGS.